2,065,932

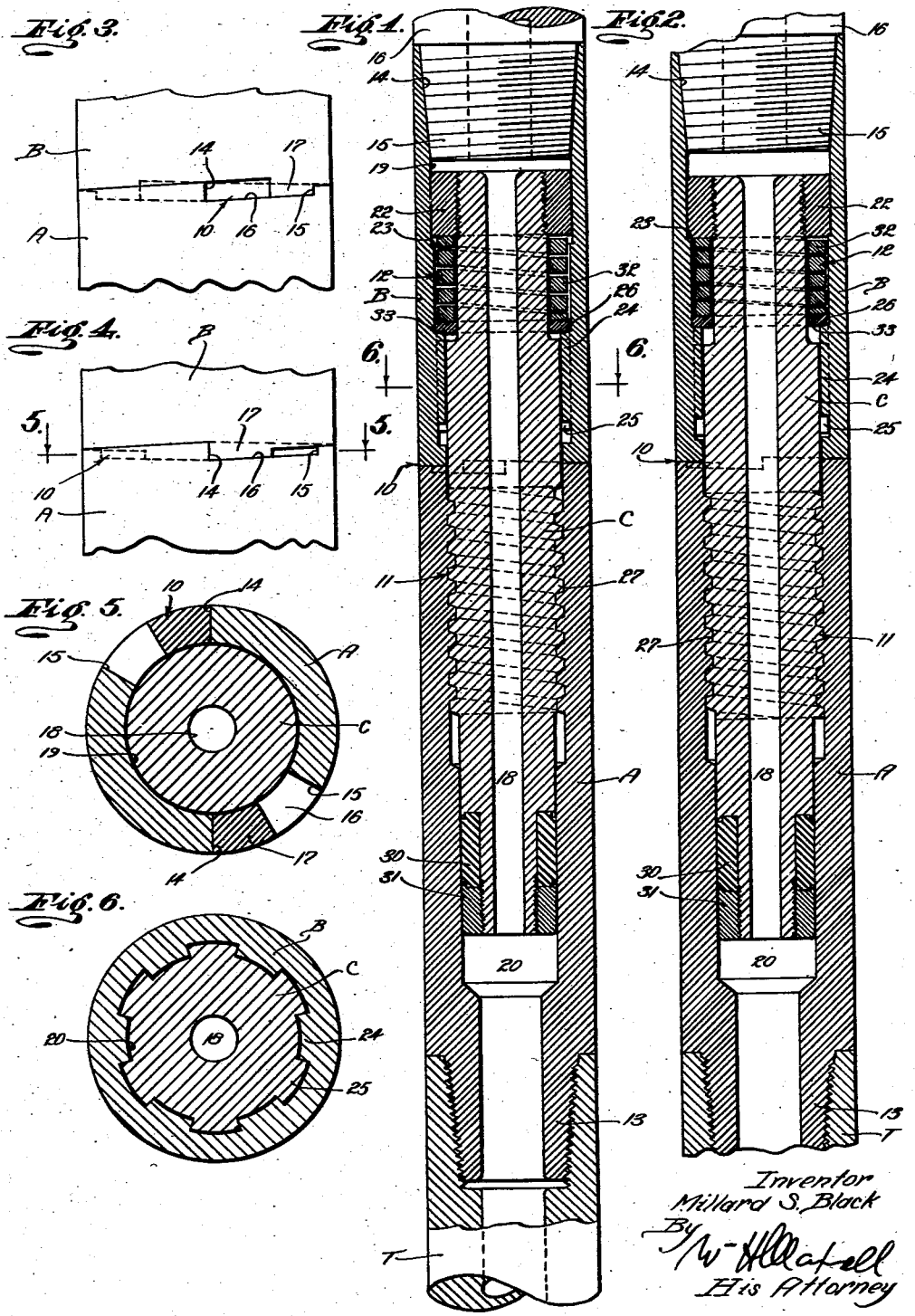
Dec. 29, 1936. M. S. BLACK 2,065,932
SAFETY JOINT
Original Filed Nov. 22, 1932
Inventor
Millard S. Black
His Attorney Patented Dec. 29, 1936

UNITED STATES PATENT OFFICE 2,065,932

SAFETY JOINT

Millard Sumter Black, Los Angeles, Calif., assignor, by direct and mesne assignments, of one-third to Lawrence F. Baash, Los Angeles, Calif., and one-third to Erwin Burns, Los Angeles, Calif., and one-third to Harry P. Wickersham, Huntington Park, Calif.

Application November 22, 1932, Serial No. 643,848
Renewed June 1, 1936

14 Claims. (Cl. 255—28)

This invention relates to a joint or connection, and relates more particularly to a safety joint for connecting two parts or sections of a string of drill pipe, or the like. It is a general object of the present invention to provide a simple, practical and effective safety joint to be inserted in a string of drill pipe, or the like, that forms a strong, positive and dependable connection in the string, and that may be easily and quickly disconnected when desired or found necessary.

When drilling or operating a tool in a well, it sometimes happens that the tool becomes stuck in the well so that it cannot be withdrawn. It is the common practice to provide a safety joint in the drilling string near or adjacent the tool which joint is capable of being disconnected so that the major portion of the drilling string may be withdrawn from the well in the event that the tool becomes caught. Difficulty has been encountered in previous attempts to provide a safety joint that forms a positive rigid connection in the drilling string and is capable of being easily and quickly disconnected.

It is an object of the invention to provide a safety joint that is, when in normal operating condition, rigid and unyielding to both compression and tensile strains and is dependable and effective in transmitting torsional strains.

It is another object of the invention to provide a safety joint that cannot be accidentally disconnected during the normal or usual drilling operations.

It is another object of the invention to provide a safety joint that may be easily disconnected by turning the drill slightly in a reverse direction and then applying a tensile strain on the string and turning the string further in a reverse direction while the strain is maintained.

It is another object of the invention to provide a safety joint that will not become jammed or made too tight by the strains or usage to which it may be subjected.

It is another object of the invention to provide a safety joint of the character mentioned that embodies a minimum number of simple, sturdy parts.

Other objects and features of the invention will be best and fully understood from the following detailed description of a typical form and application of the invention, throughout which description reference will be had to the accompanying drawing, in which:

Fig. 1 is a central longitudinal sectional view of the safety joint showing its parts in the partially released positions. Fig. 2 is a view similar to Fig. 1 showing the parts in the fully made-up or connected positions. Fig. 3 is a fragmentary side elevation of the device showing the clutch parts in the partially released position. Fig. 4 is a view similar to Fig. 3 showing the clutch parts in the normal or fully locked position. Fig. 5 is a transverse sectional view taken as indicated by line 5—5 on Fig. 4, and Fig. 6 is an enlarged transverse detailed sectional view taken as indicated by line 6—6 on Fig. 1.

The safety joint provided by the present invention includes two separable body sections A and B having cooperating clutch parts or means 10, a third or internal section C shiftable longitudinally relative to the section B and having a releasable threaded connection 11 with the section A, and means 12 for governing the disconnection of the clutch means 10.

The sections A and B when connected together by the section C and the other parts of the joint constitute an assembly adapted to be interposed in a string or drill pipe, or the like. The sections A and B are tubular members and are preferably of the same diameter as illustrated in the drawing. The section A which I will term the lower section, is provided at its lower end with a reduced and tapered screw threaded pin 13 to facilitate connection of the section A with the lower portion of the drilling string or tool T. A screw threaded socket 14 may be provided in the upper end of the section B to receive the threaded pin 15 of a part or connecting member 16 of the operating or drilling string. The body sections A and B of the joint are longitudinally aligned and the lower end of the section B is normally in engagement with the upper end of a section A.

The clutch means 10 is provided at the abutting ends of the sections A and B to transmit the torsional strains between the sections and to prevent jamming or excessive tightening of the threaded connection 11. The abutting ends of the sections A and B are preferably flat and radial to the longitudinal axes of the sections and are slightly pitched or inclined as illustrated in Figs. 3 and 4 of the drawing. In the particular embodiment of the invention illustrated in the drawing, the abutting ends of the sections A and B are pitched or inclined in the right hand direction. The clutch means 10 provides substantial diametrically opposite notches in the upper end of the section A presenting at their ends radial stop or clutch shoulders 14 and 15. The bottoms or lower walls 16 of the clutch notches are pitched in the same direction as the lower end of the section B and may be substantially the same pitch as the end of the section. The shoulders 14 which are at the forward ends of the notches are of greater height than the shoulders 15 at the rear ends of the notches. Downwardly projecting lugs or clutch parts 17 are provided on the lower end of the section B to cooperate with the notches just described. The sides of the clutch parts 17 are flat and radial to effectively cooperate with the shoulders 14 and 15, while the lower ends of the clutch parts 17 are inclined to slidably engage the bottom walls 16 of the notches. In accordance with the invention, the clutch parts 17 are proportioned to have considerable movement in the notches. When the safety joint is fully made up or its parts are in the positions illustrated in Fig. 2 of the drawing, the clutch parts 17 are in engagement with the large shoulders 14 at the forward ends of the notches and the adjacent ends of the body sections A and B are in abutment. It will be apparent how the clutch parts 17 are adapted to cooperate with the shoulders 14 to transmit right hand torsional strains between the sections A and B, and how the clutch parts 17 may cooperate with the shorter shoulders 15 in transmitting left hand torsional strains between the sections A and B.

The section C is arranged within the sections A and B and acts to normally connect the two sections against relative longitudinal movement. The internal section C is tubular, having a central longitudinal fluid passage 18 extending through it from one end to the other to connect the opening 19 of the section B with the opening 20 of the section A. In accordance with the invention, the internal section C is held against rotation relative to the section B, but has limited longitudinal movement relative to the section B. A nut 22 is provided on the upper end part of the section C and is adapted to cooperate with the lower end of the pin 15 to limit upward movement of the section C in the section B. An upwardly facing shoulder 23 is provided on the wall of the section B and is adapted to be engaged by the lower end of the nut 22 to normally permit upward movement of the section B relative to the section C. The means for preventing rotation of the internal section C relative to the section B includes cooperating splines 24 and 25 on the walls of the section B and the exterior of the internal section C, respectively. The upper ends of the splines 24 present upwardly facing shoulders 26 on the walls of the opening 20 at a point spaced below the nut 22 on the section C. The internal section C is slidable or shiftable longitudinally in the opening 20 of the section B and extends downwardly to project into the section A.

The releasable threaded connection 11 includes cooperating threads 27 on the wall of the opening 20 and the section C. The threads 27 are comparatively heavy and have a substantial pitch. In accordance with the invention, the threads 27 of the connection 11 are pitched in the same direction as the bottoms 16 of the clutch notches and the abutting ends of the sections A and B. The invention includes means for packing or sealing between the sections A and C. Packing 30 surrounds a reduced inner end portion of the section C and seals with the walls of the opening 20. A nut 31 is threaded on the lower end of the section C to compress the packing 30.

The means 12 for governing the release or disconnection of the clutch means 10 includes an expansible member in the form of a coiled or spiralled spring 32. The spring 32 surrounds the internal section C between the lower end of the nut 22 and the spline shoulders 26. The spring 32 is normally under compression. A suitable washer 33 may be provided between the lower end of the spring 32 and the shoulder 26. In the particular case illustrated in the drawing, the spring 32 is formed of stock of squared or rectangular cross section as illustrated in the drawing. When the safety joint is fully connected or made up with the internal section C threaded into the section A and with the ends of the sections A and B in abutment, and the spring 32 is compressed to a considerable extent, there may be suitable clearance between the convolutions of the spring.

It is believed that the utility and practicability of the safety joint provided by the present invention will be readily apparent from the foregoing detailed description. Under normal conditions, the parts of the safety joint are in the positions illustrated in Figs. 2 and 4 of the drawing in which positions the clutch parts 17 are in abutment with the shoulders 14 and the spring 32 is compressed to yieldingly hold the clutch lugs 17 in engagement with the bottom walls 16 of the notches. With the parts in the positions just mentioned, the clutch parts 17 are adapted to transmit right hand rotational strains between the sections A and B and the abutting ends of the sections A and B are adapted to transmit compression strains between the sections. The shoulder 23 normally engages the end of the nut 22 so that the section C is adapted to directly transmit tensile strains between the sections A and B. From the above it is apparent that the safety joint forms a dependable and rigid or unyielding connection between the parts of the string of drill pipe, or the like. When it is desired to disconnect the safety joint, the drilling string may be manipulated to turn the section B in a left hand direction relative to the section C and move the clutch parts 17 into abutment with the shoulders 15. Turning of the section B in a left hand direction relative to the section A causes the threads 27 to cooperate to move the internal section C upwardly relative to the sections A and B. Upward movement of the section C allows the spring 32 to expand to a condition such as illustrated in Fig. 1 of the drawing. As the threads 27 have a substantial pitch the section C is moved upwardly a considerable distance so that the spring 32 is permitted to expand a substantial amount. A tensile strain may then be put on the drilling string to lift the clutch parts 17 out of the clutch notches so they pass or clear the shoulders 15. The tensile strain placed on the section B causes compression of the expanded spring 32 which yielding or compression of the spring permits the disengagement of the clutch parts 17 from the shoulders 15. After the clutch parts 17 have been raised out of engagement with the shoulders 15, the section B may be rotated to unthread or disengage the threads 17 and thus disconnect the safety joint.

The safety joint provided by the invention is particularly strong and dependable, as it is operable to transmit strains and forces of various characters without loosening and without yielding. The parts of the joint are all simple and inexpensive of manufacture. The device does not in any way interfere with the continuous flow of circulating fluid through the string and the packing 30 prevents the threads 27 from becoming mudded up. The clutch parts 17 in cooperating with the shoulders 14 prevent excessive tightening of the threads 27 so that the threads 27 can readily be unthreaded before other threaded connections of the drilling string will loosen.

Having described only a typical form and application of my invention, I do not wish to limit myself to the specific details set forth, but wish to reserve to myself any changes or variations that may appear to those skilled in the art or fall within the scope of the following claims.

Having described my invention, I claim:

1. A safety joint for connecting two members of a well string including two tubular sections, one to be connected to one member, the other to the other member, clutch parts on the sections for limiting relative rotation between the sections, a third section having a releasable threaded connection with one of the said sections and having a longitudinally shiftable connection with the other section, and a spring under compression between the said other section and the third section to resist longitudinal movement between said other section and the third section in one direction and compressible by the application of a tensile strain to the string at the surface of the ground to permit disconnection of the clutch parts upon relative turning between the said two sections.

2. A safety joint including two tubular sections, clutch parts on adjacent ends of the sections adapted to limit relative turning of the sections, a third section releasably threaded into one of the sections and having shouldered engagement with the other section which prevents longitudinal movement between the said section and said other section, and a spring between parts of the said other section and the third section urging the clutch parts into cooperation and yieldable upon relative turning of the first mentioned sections to permit disconnection of the clutch parts.

3. A safety joint including two tubular sections, clutch parts on adjacent ends of the sections adapted to limit relative turning of the sections, a third section releasably threaded into one of said sections and extending into and having a slidable key connection with the other of said sections, and means acting between opposing parts of the said other section and the third section to hold the clutch parts in cooperative engagement and yieldable to permit disengagement of the clutch parts after relative turning of the said two sections.

4. A safety joint including two tubular sections, clutch parts on adjacent ends of the sections adapted to limit relative turning of the sections, a third section releasably threaded into one of said sections and extending into and having a slidable key connection with the other of said sections, shoulders on the third section and the said other section to prevent relative longitudinal movement between the sections in one direction, and means yieldingly holding the said adjacent ends in abutment and yieldable with turning of the first mentioned section relative to the said other section in one direction to permit disengagement of the clutch parts by a tensile strain on the sections whereby the threaded connection may be disconnected.

5. A safety joint including two tubular sections, clutch parts on adjacent ends of the sections adapted to limit relative turning of the sections, a third section releasably threaded into one of said sections and extending into the other of said sections, there being a fluid passage through the sections, means for sealing between the first mentioned section and the third section and means governing the release of the clutch parts normally holding the clutch parts in engagement and yieldable to permit disconnection of the clutch parts after limited unthreading of the third section from said other section by the application of an external tensile strain to said other section.

6. A safety joint including two tubular sections, clutch parts on adjacent ends of the sections adapted to cooperate to limit relative turning of the sections, and releasable means holding the sections against relative longitudinal movement, the said means including a third section threaded into one of the said sections, and shoulders on the third section and the other of said sections normally preventing longitudinal movement between the sections in one direction, the clutch parts being disengageable after limited unthreading of the third section and said other section by the application of an external tensile strain to said other section.

7. A safety joint including two tubular sections, clutch parts on adjacent ends of the sections adapted to cooperate to limit relative turning of the sections, and releasable means holding the sections against relative longitudinal movement, the said means including a third section threaded into one of the said sections and having a key connection with the other of said sections, and shoulders on the third section and the said other section normally preventing longitudinal movement between the sections in one direction, the clutch parts being disengageable after limited unthreading of the third section and the said other section by the application of an external tensile strain to said other section.

8. A safety joint including two tubular sections, clutch parts on adjacent ends of the sections adapted to cooperate to limit relative turning of the sections, and releasable means holding the sections against relative longitudinal movement, the said means including a third section threaded into one of the said sections, keys on the said other section and the third section keying the third section to the said other section for longitudinal movement, a shoulder on the third section, and a spring under compression between the shoulder and the ends of the keys on the said other section to resist relative longitudinal movement of the sections in one direction.

9. A safety joint including, two tubular sections, clutch parts on adjacent ends of the sections adapted to cooperate to limit turning between the sections, a third section within the tubular sections, a threaded connection between the third section and one of the first mentioned sections, a sliding key connection between the third section and the other of the first mentioned sections, packing on the third section to seal with the first mentioned section, and means controlling the disengagement of the clutch parts, the said means including a spring under compression between parts on the third section and the said other section.

10. A safety joint including, two tubular sections, parts on the sections to cooperate to limit relative rotation between the sections and disengageable by relative longitudinal movement between the sections, a third section extending through the said sections, a releasable threaded connection between the third section and one of said sections, a longitudinally shiftable and non-rotatable connection between the third section and the other of said sections, and shoulders on the third section and said other section normally cooperating to transmit tensile strains between the sections, the said parts being related to allow limited relative rotary movement between said two sections to cause the threads of the threaded connection to shift the third section longitudinally to separate said shoulders whereby the said parts may be disengaged.

11. A safety joint including, two sections, a third section having a threaded connection with one of said sections and a slidable key connection with the other of said sections, abutments on the third section and said other section cooperating to transmit tensile strains between the sections, there being a notch in one of said sections and a lug on the other of said sections adapted to cooperate with an end wall of the notch to prevent relative rotation between said two sections in one direction to maintain the abutments in cooperation and shiftable in the notch upon relative rotation between the sections in the other direction to cause the threads of the threaded connection to shift the third section longitudinally and separate the abutments whereby the lug may be disengaged from the notch by relative longitudinal movement between the said two sections.

12. A safety joint including, two sections, a third section having a threaded connection with one of said sections, and a slidable key connection with the other of said sections, abutments on the third section and said other section cooperating to transmit tensile strains between the sections, there being a notch in one of said sections, and a lug on the other of said sections adapted to cooperate with an end wall of the notch to prevent relative rotation between said two sections in one direction to maintain the abutments in cooperation and shiftable in the notch upon relative rotation between the sections in the other direction to cause the threads of the threaded connection to shift the third section longitudinally and separate the abutments whereby the lug may be disengaged from the notch by relative longitudinal movement between the said two sections, the bottom wall of the notch and the inner end of the lug being inclined in the same direction as the threads of the threaded connection.

13. A safety joint including, two tubular sections, parts on the sections to cooperate to limit relative rotation between the sections and disengageable by relative longitudinal movement between the sections, a third section extending through the said sections, a releasable threaded connection between the third section and one of said sections, a longitudinally shiftable and non-rotatable connection between the third section and the other of said sections, shoulders on the third section and the said other section cooperating to transmit tensile strains between the sections, the said parts being related to allow limited rotary movement between said sections in one direction to cause the threads of the threaded connection to move the third section relative to said other section to separate said shoulders whereby said parts may be disengaged by relative longitudinal movement between said sections, and spring means yieldingly resisting such longitudinal movement between said sections.

14. A safety joint including, two tubular sections, parts on the sections to cooperate to limit relative rotation between the sections and disengageable by relative longitudinal movement between the sections, a third section extending through the said sections, a releasable threaded connection between the third section and one of said sections, a longitudinally shiftable and non-rotatable connection between the third section and the other of said sections, shoulders on the third section and the said other section cooperating to transmit tensile strains between the sections, the said parts being related to allow limited rotary movement between said sections in one direction to cause the threads of the threaded connection to move the third section relative to said other section to separate said shoulders whereby said parts may be disengaged by relative longitudinal movement between said sections, and a spring acting under compression between the third section and said other section to resist such relative longitudinal movement of said sections.

MILLARD SUMTER BLACK.